United States Patent
Saruhashi et al.

(10) Patent No.: US 11,555,080 B2
(45) Date of Patent: Jan. 17, 2023

(54) METHOD FOR PREPARING ANIONIC MACROMOLECULAR COMPOUND EXHIBITING IMPROVED WATER SOLUBILITY

(71) Applicant: NISSAN CHEMICAL CORPORATION, Tokyo (JP)

(72) Inventors: Koichiro Saruhashi, Funabashi (JP); Yoko Okuni, Tokyo (JP); Keisuke Morodome, Funabashi (JP); Jun Takeoka, Funabashi (JP)

(73) Assignee: NISSAN CHEMICAL CORPORATION, Tokyo (JP)

( * ) Notice: Subject to any disclaimer, the term of this patent is extended or adjusted under 35 U.S.C. 154(b) by 384 days.

(21) Appl. No.: 16/609,674

(22) PCT Filed: May 1, 2018

(86) PCT No.: PCT/JP2018/017392
§ 371 (c)(1),
(2) Date: Oct. 30, 2019

(87) PCT Pub. No.: WO2018/203548
PCT Pub. Date: Nov. 8, 2018

(65) Prior Publication Data
US 2020/0055962 A1    Feb. 20, 2020

(30) Foreign Application Priority Data
May 1, 2017 (JP) .............................. JP2017-091362

(51) Int. Cl.
*C08B 37/00* (2006.01)
*B01J 39/04* (2017.01)

(52) U.S. Cl.
CPC ............. *C08B 37/006* (2013.01); *B01J 39/04* (2013.01)

(58) Field of Classification Search
CPC ............................... C08B 37/006; B01J 39/04
See application file for complete search history.

(56) References Cited

U.S. PATENT DOCUMENTS

| | | | |
|---|---|---|---|
| 5,179,197 A | 1/1993 | Uchida et al. | |
| 10,519,419 B2 * | 12/2019 | Otani | ........... C12N 5/0018 |
| 2004/0039070 A1 | 2/2004 | Parker, Jr. | |
| 2008/0226579 A1 | 9/2008 | Shin et al. | |
| 2014/0106348 A1 | 4/2014 | Nishino et al. | |
| 2014/0251911 A1 | 9/2014 | Skudas | |
| 2017/0002311 A1 | 1/2017 | Otani et al. | |

FOREIGN PATENT DOCUMENTS

| | | |
|---|---|---|
| EP | 1466923 A1 | 10/2004 |
| EP | 2878664 A1 | 6/2015 |
| JP | H04-211100 A | 8/1992 |
| JP | 2000-070933 A | 3/2000 |
| JP | 2003-176371 A | 6/2003 |
| JP | 2004-307344 A | 11/2004 |
| JP | 2009-022901 A | 2/2009 |
| JP | 2009-507014 A | 2/2009 |
| JP | 2009-165985 A | 7/2009 |
| JP | 2014-534055 A | 12/2014 |
| JP | 2017-018893 A | 1/2017 |
| WO | WO 2014/017513 A1 | 1/2014 |
| WO | WO 2015/111685 A1 | 7/2015 |

OTHER PUBLICATIONS

Japanese Patent Office, International Search Report in International Patent Application No. PCT/JP2018/017392 (dated Jul. 10, 2018).

* cited by examiner

*Primary Examiner* — Leigh C Maier
*Assistant Examiner* — Everett White
(74) *Attorney, Agent, or Firm* — Leydig, Voit & Mayer, Ltd.

(57) ABSTRACT

The present invention provides a method for removing a divalent metal cation from a macromolecular compound having an anionic functional group and containing the divalent metal cation, including (1) suspending a macromolecular compound having an anionic functional group and containing a divalent metal cation in a solution in which an electrolyte that releases an alkali metal ion is dissolved at a concentration at which the macromolecular compound is salted out, and (2) performing, in the obtained suspension, an ion exchange reaction to exchange the divalent metal cation contained in the macromolecular compound with the alkali metal ion.

16 Claims, 2 Drawing Sheets

METHOD FOR PREPARING ANIONIC MACROMOLECULAR COMPOUND EXHIBITING IMPROVED WATER SOLUBILITY

CROSS-REFERENCE TO RELATED APPLICATIONS

This patent application is the U.S. national phase of International Patent Application No. PCT/JP2018/017392, filed May 1, 2018, which claims the benefit of Japanese Patent Application No. 2017-091362, filed on May 1, 2017, which are incorporated by reference in their entireties herein.

TECHNICAL FIELD

The present invention relates to a method for preparing a macromolecular compound with improved water solubility and having an anionic functional group such as deacylated gellan gum (DAG) and the like.

BACKGROUND ART

A specific compound represented by a macromolecular compound having an anionic functional group such as deacylated gellan gum (DAG) and the like forms a three-dimensional network (irregular structure) dispersed in water by assembling via a divalent metal cation (e.g., calcium ion) or the like. When cells are cultured in a liquid medium containing this three-dimensional network, the three-dimensional network functions as a carrier for suspending the cells, and the cells in the medium are trapped in the three-dimensional network and do not sink. Thus, the cells can be cultured while being uniformly dispersed in a suspended state (static suspension culture) without requiring shaking, a rotating operation or the like. In addition, since the aforementioned three-dimensional network can be formed without substantially increasing the viscosity of the liquid medium, a medium composition containing the three-dimensional network is also superior in operability in passages and the like (patent documents 1 and 2). The medium composition permitting static suspension culture has various superior properties such as promotion of proliferation activity of various cells and the like. Therefore, application to a wide range of technical fields such as regenerative medicine, large-scale production of proteins and the like is expected.

In the following, the above-mentioned specific compounds such as a macromolecular compound having an anionic functional group and the like are also referred to as "particular compounds", and a substance such as a divalent metal cation and the like that binds the particular compounds to each other is also referred to as a "binding substance".

Commercially available deacylated gellan gum powder contains a trace amount of divalent metal cations such as calcium ion and the like. When this is directly added to cold water, deacylated gellan gum is topically crosslinked via divalent metal cation to form an irregular structure. Thus, the powder is not easily dissolved uniformly. To dissolve a commercially available deacylated gellan gum powder in water, therefore, it is necessary to, for example, specially add a deacylated gellan gum powder to hot water or the like.

As a means for solving the problem of water-insolubility of the commercially available deacylated gellan gum powder, it has been proposed to use a deacylated gellan gum powder from which divalent metal cations such as calcium ion and the like have been removed in advance (patent document 3). The deacylated gellan gum powder from which divalent metal cations mixed therein have been removed in advance is easily dissolved in water at room temperature and cold water.

DOCUMENT LIST

Patent Documents patent document 1: WO 2014/017513
patent document 2: US-A-2014/0106348
patent document 3: WO 2015/111685

SUMMARY OF THE INVENTION

Problems to be Solved by the Invention

In the method of patent document 3, a macromolecular compound having an anionic functional group such as deacylated gellan gum powder and the like and mixed with a divalent metal cation is once dissolved in water, and the resulting solution is treated with a cation exchanger to remove the divalent metal cation. Then, the treated solution is freeze-dried to obtain a powder of the macromolecular compound having an anionic functional group with the divalent metal cation removed therefrom. In this method, however, a powder of the macromolecular compound having an anionic functional group mixed with a divalent metal cation needs to be dissolved in a large amount of water to perform the ion exchange resin treatment. Therefore, the method is not sufficiently satisfactory in terms of volume efficiency. Patent document 3 introduces, as a method for improving the volume efficiency of the divalent metal cation removal step, a method of mixing a macromolecular compound having an anionic functional group such as deacylated gellan gum and the like with a cation exchanger (e.g., cation exchange resin) wherein the macromolecular compound is in a suspended state without completely dissolved in water (batch method). Even in this case, since the macromolecular compound having an anionic functional group eventually needs to be dissolved entirely in water after the cation exchanger treatment. Thus, the volumetric efficiency is bound by solubility.

It is therefore an object of the present invention to provide a method for preparing, with higher volume efficiency, a macromolecular compound having anionic functional groups such as deacylated gellan gum and the like and with a reduced amount of divalent metal cation mixed therein.

Means of Solving the Problems

The present inventors considered that the volume efficiency can be improved if a macromolecular compound having an anionic functional group could be subjected to an ion exchange reaction while maintaining a slurry state. As a result of intensive studies, they exposed a powder of a macromolecular compound having an anionic functional group such as deacylated gellan gum and the like and containing a divalent metal cation to a solution of a salting out concentration of an electrolyte that releases an alkali metal ion. As a result, the macromolecular compound having an anionic functional group was not dissolved by the salting out effect but maintained a slurry state, an ion exchange reaction in which the divalent metal cations (calcium ion, magnesium ion etc.) in the macromolecular compound are exchanged with alkali metal ion in the solution proceeded, and a macromolecular compound having an anionic functional group such as deacylated gellan gum and the like and with a reduced amount of divalent metal cations mixed therein could be obtained. This ion exchange reaction could be performed with high volume efficiency because dissolution of a macromolecular compound having an anionic functional group in a solvent was not necessary. The ion exchange treated powder of the anionic macromolecular compound was highly soluble in water and could be easily dissolved in cold water without requiring a heat treatment such as an autoclave treatment and other treatments. In addition, since mixing of divalent metal cations is decreased, a three-dimensional network of the anionic macromolecular compound assembled via a divalent metal cation and the like is not easily formed when dissolved in pure water, and the obtained aqueous solution could be easily sterilized by filtration through a filter.

Based on these findings, they have conducted further studies and completed the present invention.

That is, the present invention is as follows:

[1] A method for removing a divalent metal cation from a macromolecular compound having an anionic functional group and the divalent metal cation, comprising
(1) exposing a macromolecular compound having an anionic functional group and a divalent metal cation to a solution in which an electrolyte that releases an alkali metal ion is dissolved at a concentration at which the macromolecular compound is salted out, and
(2) performing an ion exchange reaction to exchange the divalent metal cation contained in the macromolecular compound with the alkali metal ion.
[2] The method of [1] wherein the solution of the electrolyte comprises water.
[3] The method of [2] wherein the solution of the electrolyte further comprises alcohol.
[4] The method of [3] wherein the alcohol is ethanol.
[5] The method of any of [1] to [4] wherein the alkali metal ion is sodium ion.
[6] The method of any of [1] to [4] wherein the electrolyte that releases an alkali metal ion is sodium chloride.
[7] The method of [6] wherein the concentration of sodium chloride in the solution is not less than 10% (w/v).
[8] The method of any of [1] to [7] wherein the ion exchange reaction is performed at 10-80° C.
[9] The method of any of [1] to [8] wherein the macromolecular compound is exposed to the solution of the electrolyte by suspending the macromolecular compound in the solution of the electrolyte.
[10] The method of any of [1] to [9] wherein the macromolecular compound is exposed to the solution of the electrolyte by passing the solution of the electrolyte through a cake of the macromolecular compound.
[11] The method of any of [1] to [10] further comprising recovering after the ion exchange reaction the macromolecular compound having an anionic functional group, wherein the macromolecular compound shows a decreased amount of the divalent metal mixed therein.
[12] The method of [11] further comprising removing the electrolyte that releases an alkali metal ion, by washing the recovered macromolecular compound having an anionic functional group.
[13] The method of [11] or [12] wherein a content of calcium ion in the recovered macromolecular compound having an anionic functional group is not more than 1000 ppm.
[14] The method of any of [1] to [13] wherein the macromolecular compound having an anionic functional group is deacylated gellan gum or a salt thereof.

Effect of the Invention

According to the present invention, a macromolecular compound having an anionic functional group can be subjected to an ion exchange reaction while maintaining a slurry state. As a result, a divalent metal mixed in the macromolecular compound having an anionic functional group solvent can be removed with higher volume efficiency as compared to the conventional method requiring dissolution. Therefore, the method of the present invention is useful for industrial-level purification of a large amount of a macromolecular compound having an anionic functional group.

A macromolecular compound having an anionic functional group and the with a decreased amount of a divalent metal mixed therein, which is prepared by the method of the present invention, has high solubility in water, does not require a heat treatment such as an autoclave treatment and other treatments, and can be easily dissolved in cold water. The container used for dissolving does not require heat resistance. Therefore, using a macromolecular compound having an anionic functional group and with a decreased amount of a divalent metal mixed therein, which is prepared by the method of the present invention, a medium composition capable of static culture while cells and/or tissues are uniformly dispersed in a suspended state can be prepared conveniently.

Maintaining aseptic conditions during mass production requires highly controlled equipment. However, in one embodiment of the method of the present invention, since lower alcohol and high concentration brine, which are generally considered to suppress propagation of living bacteria, are used, the viable counts can be controlled without requiring aseptic equipment.

DESCRIPTION OF EMBODIMENTS

Figure 1:
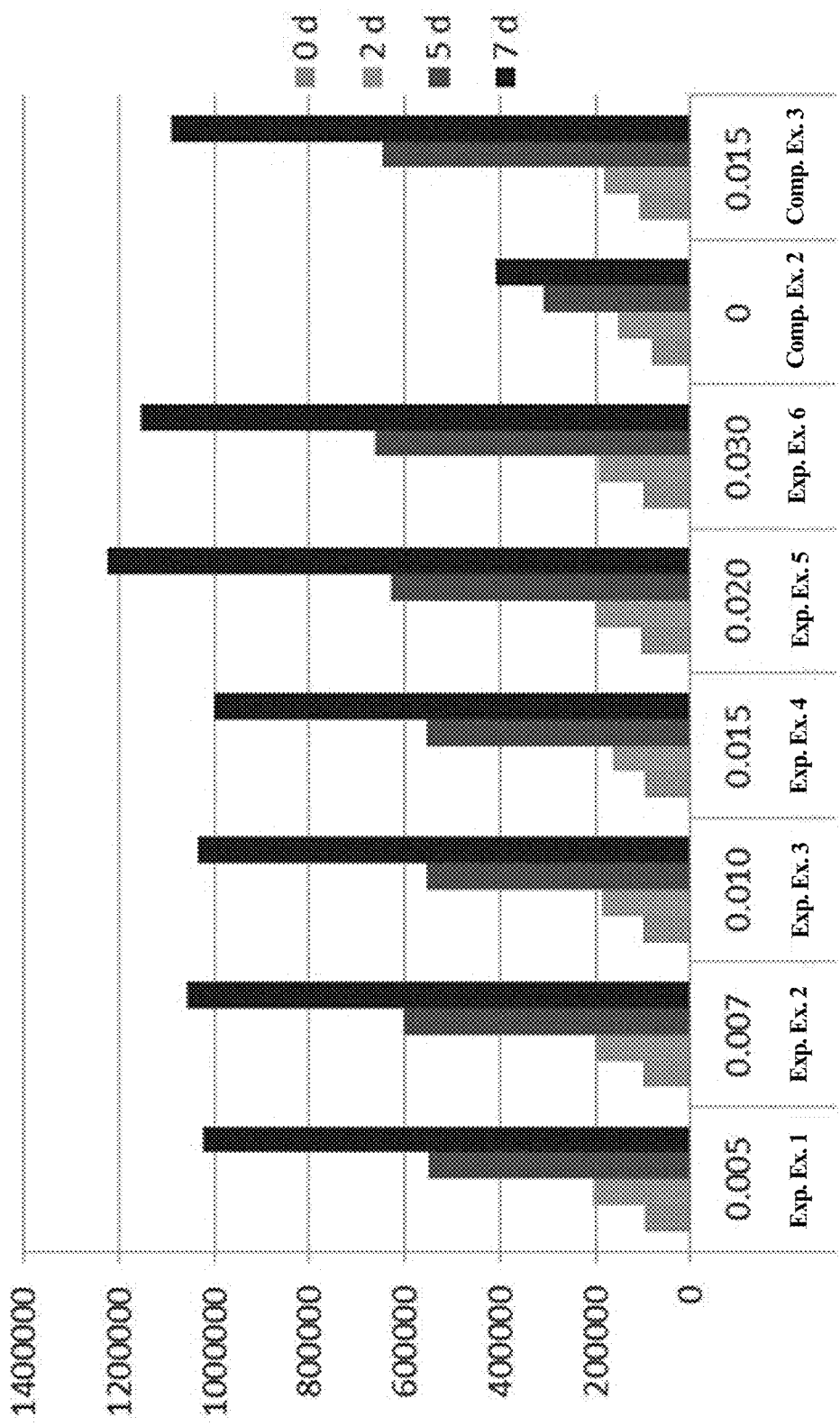
FIG. 1 is a graph showing the results of Experimental Examples 1-6 and Comparative Examples 2 and 3.

The present invention provides a method for removing a divalent metal cation from a macromolecular compound having an anionic functional group and containing the divalent metal cation, including
(1) exposing a macromolecular compound having an anionic functional group and containing a divalent metal cation to a solution in which an electrolyte that releases an alkali metal ion is dissolved at a concentration at which the macromolecular compound is salted out, and
(2) performing an ion exchange reaction to exchange the divalent metal cation contained in the macromolecular compound with the alkali metal ion.

The macromolecular compound having an anionic functional group used in the present invention is a compound that can form a structure capable of dispersing cells or tissues by assembling via a divalent metal cation. Here, the anionic functional group means a functional group that can take the form of an anion in water and includes, for example, carboxy group, sulfo group, sulfuric acid group (—O—S(O)$_2$OH), phosphoric acid group and the like.

Specific preferable examples of the macromolecular compound to be used in the present invention include, but are not particularly limited to, polysaccharides obtained by polymerizing 10 or more monosaccharides (e.g., triose, tetrose, pentose, hexose, hexose etc.), more preferably, acidic polysaccharides having anionic functional groups. The acidic polysaccharide here is not particularly limited as long as it has an anionic functional group in the structure thereof. It includes, for example, polysaccharides having a constitutional unit derived from uronic acid (e.g., glucuronic acid, iduronic acid, galacturonic acid, mannuronic acid), polysaccharide having a sulfuric acid group ((—O—S(O)$_2$OH)) or a phosphoric acid group in part of the structure, or polysaccharides having the both structures, and also includes not only polysaccharides obtained from nature but also polysaccharides produced by microorganisms, polysaccharides produced by genetic engineering and polysaccharides artificially synthesized using enzymes. More specifically, it is exemplified by polysaccharides constituted of one or more kinds selected from the group consisting of hyaluronic acid, gellan gum, deacylated gellan gum (hereinafter sometimes to be referred to as DAG), rhamsan gum, diutan gum, xanthan gum, alginic acid, carrageenan, locust bean gum, hexuronic acid, fucoidan, pectin, pectin acid, pectinic acid, heparan sulfate, heparin, heparitin sulfate, keratosulfate, chondroitin sulfate, dermatan sulfate, rhamnan sulfate and a salt thereof. The polysaccharide is preferably hyaluronic acid, DAG, diutan gum, xanthan gum, carrageenan or a salt thereof, more preferably, DAG or a salt thereof. DAG to be used may be phosphorylated. The phosphorylation can be performed by a known method.

The salt here includes, for example, salts of alkali metals such as lithium, sodium, potassium, salts of alkaline earth metals such as calcium, barium, magnesium, salts of aluminum, zinc, copper, iron, ammonium, organic base and amino acid and the like.

In the present invention, plural kinds (preferably two kinds) of polysaccharides having the above-mentioned anionic functional group can be used in combination. Polysaccharides having an anionic functional group and polysaccharides not having an anionic functional group may be combined. The kind of combination of polysaccharides is not particularly limited as long as it can form the aforementioned structure in a liquid medium by binding via a divalent metal cation; however, the combination preferably includes at least DAG or a salt thereof. That is, the combination of preferable polysaccharides includes, for example, DAG or a salt thereof, and polysaccharides other than DAG or a salt thereof (e.g., xanthan gum, alginic acid, carrageenan, diutan gum, methylcellulose, locust bean gum or a salt thereof). Examples of the specific combination of polysaccharides include, but are not limited to, DAG and rhamsan gum, DAG and diutan gum, DAG and xanthan gum, DAG and carrageenan, DAG and locust bean gum, DAG and κ-carrageenan, DAG and sodium alginate, DAG and methylcellulose and the like.

Deacylated gellan gum is a linear macromolecular polysaccharide having 4 molecule saccharides of 1-3 linked glucose, 1-4 linked glucuronic acid, 1-4 linked glucose and 1-4 linked rhamnose as constitutional units, which is a polysaccharide of the following formula (I) wherein $R_1$ and $R_2$ are hydrogen atoms and n is an integer of 2 or more. Note that $R_1$ may contain a glyceryl group and $R_2$ may contain an acetyl group. The content of the glyceryl group is preferably not more than 10 mol %, more preferably not more than 1 mol %, of the whole $R_1$. The content of the acetyl group is preferably not more than 10 mol %, more preferably not more than 1 mol %, of the whole $R_2$.

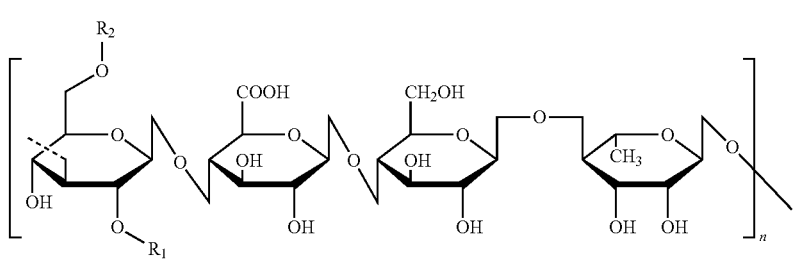

(I)

The macromolecular compound having an anionic functional group may be obtained by a chemical synthesis method. When the particular compound is a naturally occurring substance, it may be obtained by extraction, separation and purification by conventional techniques from various plants, various animals, and various microorganisms containing the compound. For example, gellan gum can be produced by culturing the producing microorganisms in a fermentation medium, recovering the mucosa produced outside the cells by a conventional purification method, and powdering same after steps such as drying, pulverization and the like. In the case of deacylated gellan gum, an alkali treatment may be applied during recovery of the mucosa and glyceryl groups and acetyl groups bound to 1-3 linked glucose residues are deacylated and the gellan gum is recovered. Examples of the gellan gum-producing microorganisms include, but are not limited to, *Sphingomonas erodea* and microorganisms obtained by modifying the genes of the microorganisms.

In the case of deacylated gellan gum, commercially available ones, for example, "KELCOGEL (registered trade mark of CP Kelco) CG-LA" manufactured by Sansho Co., Ltd., "KELCOGEL (registered trade mark of CP Kelco)" manufactured by San-Ei Gen F.F.I., Inc. and the like can be used. As native gellan gum, "KELCOGEL (registered trade mark of CP Kelco) HT" manufactured by San-Ei Gen F.F.I., Inc. and the like can be used.

The macromolecular compound having an anionic functional group used in the present invention is preferably isolated. "Isolation" means that an operation to remove factors other than an objective component and cell has been performed, and the natural state no longer exists. The purity of the "isolated substance X" (percentage of weight of substance X in the total weight of sample to be evaluated) is generally not less than 70%, preferably not less than 80%, more preferably not less than 90%, further preferably not less than 99%, still further preferably not less than 99.9%.

The macromolecular compound having an anionic functional group used for the method of the present invention contains a divalent metal cation. The divalent metal cation may be one kind or two or more kinds. This divalent metal cation is combined with an anionic functional group contained in the macromolecular compound and forms a salt. That is, at least a part of the macromolecular compound having an anionic functional group subjected to the method of the present invention exists as a salt with a divalent metal cation. Examples of the divalent metal cation include calcium ion, magnesium ion, zinc ion, manganese ion, iron ion, copper ion and the like. In a preferred embodiment, the macromolecular compound having an anionic functional group subjected to the method of the present invention contains at least one or both of calcium ion and magnesium ion (hereinafter to be also referred to as "calcium ion and/or magnesium ion").

The total content of divalent metal cations contained in the macromolecular compound having an anionic functional group subjected to the method of the present invention is not particularly limited as long as the divalent metal cations can be removed by the method of the present invention. It is generally not less than 200 ppm, preferably not less than 300 ppm, not less than 400 ppm, not less than 500 ppm, not less than 600 ppm, not less than 700 ppm, not less than 1000 ppm, not less than 2000 ppm, not less than 3000 ppm, not less than 4000 ppm or not less than 5000 ppm. The upper limit of the total content of the divalent metal cation is not particularly limited as long as the divalent metal cation can be removed by the method of the present invention. It is generally not more than 20000 ppm, preferably not more than 10000 ppm. In the present specification, unless particularly indicated, ppm is based on weight.

In one embodiment, the content of calcium ion contained in the macromolecular compound having an anionic functional group subjected to the method of the present invention is not particularly limited as long as the calcium ion can be removed by the method of the present invention. It is generally not less than 100 ppm, preferably not less than 200 ppm, not less than 300 ppm, not less than 400 ppm, not less than 500 ppm, not less than 1000 ppm, not less than 1100 ppm, not less than 1200 ppm, not less than 1500 ppm, not less than 2500 ppm, not less than 3000 ppm or not less than 3500 ppm. The upper limit of the calcium ion content is not particularly limited as long as the calcium ion can be removed by the method of the present invention. It is generally not more than 10000 ppm, preferably not more than 5000 ppm.

In one embodiment, the content of magnesium ion contained in the macromolecular compound having an anionic functional group subjected to the method of the present invention is not particularly limited as long as the magnesium ion can be removed by the method of the present invention. It is generally not less than 100 ppm, preferably not less than 200 ppm, not less than 500 ppm, not less than 1000 ppm or not less than 1500 ppm. The upper limit of the magnesium ion content is not particularly limited as long as the calcium ion can be removed by the method of the present invention. It is generally not more than 5000 ppm, preferably not more than 2500 ppm.

In one embodiment, the contents of calcium ion and magnesium ion contained in the macromolecular compound having an anionic functional group subjected to the method of the present invention are not particularly limited as long as the calcium ion and magnesium ion can be removed by the method of the present invention. The calcium ion content is generally not less than 200 ppm, preferably not less than 300 ppm, not less than 400 ppm, not less than 500 ppm, not less than 600 ppm, not less than 1100 ppm, not less than 1200 ppm, not less than 1500 ppm, not less than 2500 ppm, not less than 3000 ppm or not less than 3500 ppm, and the magnesium ion content is generally not less than 100 ppm, preferably not less than 200 ppm, not less than 500 ppm, not less than 1000 ppm or not less than 1500 ppm. The upper limits of the calcium ion and magnesium ion contents are not particularly limited as long as the calcium ion and magnesium ion can be removed by the method of the present invention. The calcium ion content is generally not more than 10000 ppm, preferably not more than 5000 ppm and the magnesium ion content is generally not more than 5000 ppm, preferably not more than 2500 ppm.

Commercially available deacylated gellan gum generally contains about 2000-4000 ppm calcium ion, and about 500-2000 ppm magnesium ion.

In the present specification, the content of the divalent metal cation in the macromolecular compound having an anionic functional group means the content (ppm) of the divalent metal cation in the dry powder of the macromolecular compound having an anionic functional group and was measured by inductively coupled plasma-atomic emission spectroscopy. The measurement can be performed using an inductively coupled plasma-atomic emission spectrometer (ICP-OES; SPS 5520, SII NanoTechnology Inc.).

In the present invention, a macromolecular compound having an anionic functional group and containing a divalent metal cation is exposed to a solution in which an electrolyte that releases an alkali metal ion is dissolved at a concentration at which the macromolecular compound is salted out. The electrolyte may be only one kind or two or more kinds.

Examples of the alkali metal include lithium, sodium, potassium, rubidium, cesium and francium, preferably sodium and potassium, and more preferably sodium. The electrolyte includes an inorganic electrolyte and an organic electrolyte, and is preferably an inorganic electrolyte. Inorganic electrolyte includes inorganic salts and hydroxides, and is preferably an inorganic salt. Examples of the inorganic salt include halide, carbonate, bicarbonate, sulfate, nitrate, nitrite and the like, preferably halide, carbonate and bicarbonate, more preferably halide. Examples of the halide include fluoride, chloride, bromide and iodide, preferably chloride. The electrolyte that releases an alkali metal ion is preferably an inorganic electrolyte that releases sodium ion (e.g., sodium chloride, sodium bicarbonate, sodium hydroxide, etc.) or an inorganic electrolyte that releases potassium ion (e.g., potassium chloride, potassium bicarbonate, potassium hydroxide etc.), more preferably an inorganic electrolyte that releases sodium ion (e.g., sodium chloride, sodium bicarbonate, sodium hydroxide etc.). Sodium bicarbonate tends to show low solubility in a solvent when a mixture of water and alcohol is used as the solvent, and sodium hydroxide tends to cause coloration of the reaction mixture during the ion exchange reaction. Most preferably, therefore, sodium chloride is used as the electrolyte that releases an alkali metal ion (sodium ion).

The solvent that dissolves an electrolyte that releases an alkali metal ion is not particularly limited as long as it is capable of dissolving the electrolyte to release alkali metal ion and salting out a macromolecular compound having an anionic functional group, as well as capable of exchanging the divalent metal cation contained in the salted-out macromolecular compound having an anionic functional group with alkali metal ion, and it generally contains water. The solvent may contain a liquid other than water. Examples of liquids other than water include lower alcohol (alcohol having or less carbon atoms). Addition of lower alcohol promotes salting out (precipitation) of a macromolecular compound having an anionic functional group. Examples of the lower alcohol include, but are not limited to, methanol, ethanol, n-propanol, isopropanol, n-butanol, tert-butanol and the like. The lower alcohol is preferably ethanol. In a preferred embodiment, the solvent that dissolves an electrolyte that releases an alkali metal ion is water or a mixture of water and lower alcohol (e.g., ethanol). The higher the content of lower alcohol, the more the salting out (precipitation) of a macromolecular compound having an anionic functional group is promoted. However, the solubility of the electrolyte that releases an alkali metal ion decreases and efficiency of the ion exchange reaction declines. Therefore, the content of lower alcohol in the mixture of water and lower alcohol (e.g., ethanol) is preferably a content that can achieve both promotion of salting out and ion exchange reaction. When a mixture of water and lower alcohol is used, the content of the lower alcohol in the mixture is preferably not more than 70% (v/v), more preferably not more than 60% (v/v), further preferably not more than 50% (v/v), and preferably not less than 1% (v/v), more preferably not less than 5% (v/v), further preferably not less than 10% (v/v).

The electrolyte that releases an alkali metal ion is dissolved in a solvent at a concentration that causes salting out of the macromolecular compound having an anionic functional group. The concentration varies depending on the kind of solvent (e.g., content of lower alcohol) and the kind of the macromolecular compound having an anionic functional group, but those skilled in the art can appropriately derive the salting out concentration by conducting a salting out test of the macromolecular compound having an anionic functional group to be used. From the viewpoint of promoting salting out and ion exchange reaction, higher concentrations of the electrolyte that releases an alkali metal ion is preferable. In one embodiment, an electrolyte that releases an alkali metal ion is dissolved in a solvent at a concentration of, for example, not less than 20%, preferably not less than 30%, not less than 40%, not less than 50%, not less than 60%, not less than 70%, not less than 80%, not less than 90%, not less than 95%, or not less than 99% (e.g., 100% (saturated concentration)) of the saturated concentration thereof. For example, in one embodiment, when sodium chloride is used as the electrolyte that releases an alkali metal ion, and water or a mixture of water and ethanol is used as the solvent, sodium chloride is dissolved at a concentration of generally not less than 10% (w/v), preferably not less than 15% (w/v), more preferably not less than 20% (w/v), most preferably not less than 25% (w/v). The concentration of sodium chloride in the solution may be not more than the saturation concentration.

The solution of the electrolyte that releases an alkali metal ion does not substantially contain calcium ion or magnesium ion. That a solution "does not substantially contain" substance X means that the concentration of the substance X in the solution is not more than 1 ppm. That is, the concentration of calcium ion and the concentration of magnesium ion in a solution of an electrolyte that releases an alkali metal ion are each not more than 1 ppm. Preferably, a solution of an electrolyte that releases an alkali metal ion is substantially free of divalent metal cation (i.e., the total concentration of divalent metal cations is not more than 1 ppm).

A macromolecular compound having an anionic functional group and containing a divalent metal cation is exposed to a solution of an electrolyte that releases an alkali metal ion by adding one of the solution of the electrolyte that releases an alkali metal ion and the macromolecular compound having an anionic functional group and containing a divalent metal cation to the other. Preferably, a solid macromolecular compound having an anionic functional group and containing a divalent metal cation (e.g., a powder of a macromolecular compound having an anionic functional group and containing a divalent metal cation) is exposed to the solution of an electrolyte that releases an alkali metal ion. In one embodiment, a dried solid macromolecular compound having an anionic functional group and containing a divalent metal cation (e.g., a dry powder of a macromolecular compound having an anionic functional group and containing a divalent metal cation) is exposed to a solution of an electrolyte that releases an alkali metal ion. Since the solution contains an electrolyte that releases an alkali metal ion at a salting out concentration, at least a part of the macromolecular compound having an anionic functional group and containing a divalent metal cation exposed to the solution remains in a solid (e.g., powder) state without dissolving. Here, dissolution of a part of the macromolecular compound having an anionic functional group and containing a divalent metal cation exposed to a solution of an electrolyte that releases an alkali metal ion in the solution is not prevented.

The amount of a solution of an electrolyte that releases an alkali metal ion and is exposed to a macromolecular compound having an anionic functional group and containing a divalent metal cation is such an amount that at least a part of the macromolecular compound is salted out by the electrolyte. The amount of the electrolyte solution to be exposed varies depending on the kind of the electrolyte, solvent, macromolecular compound having an anionic functional group and the like. An appropriate amount of the electrolyte solution can be exposed to the macromolecular compound by gradually adding the electrolyte solution to the macromolecular compound while confirming that a part of the macromolecular compound remains undissolved and in a suspended state, or gradually adding the macromolecular compound to the electrolyte solution until a part of the macromolecular compound remains in a solid state without dissolving. In one embodiment, the amount of the electrolyte solution used for exposure of 1 g of a macromolecular compound having an anionic functional group and containing a divalent metal cation is generally not more than 50 ml, preferably not more than 25 ml, more preferably not more than 10 ml.

The lower limit of the amount of a solution of an electrolyte that releases an alkali metal ion and is exposed to a macromolecular compound having an anionic functional group and containing a divalent metal cation is not particularly limited as long as the divalent metal cation liberated in the solution of the electrolyte by the ion exchange reaction can be removed by separating the macromolecular compound and the solution of the electrolyte after the ion exchange reaction. Generally, 1 g of a macromolecular compound having an anionic functional group and containing a divalent metal cation is exposed to not less than 0.5 ml, preferably not less than 1 ml, more preferably not less than 2 ml, of a solution of an electrolyte that releases an alkali metal ion.

For example, when deacylated gellan gum or salt thereof containing a divalent metal cation is exposed to a solution of an electrolyte (e.g., sodium chloride) that releases sodium ion in water or a mixture of water and alcohol (e.g., ethanol), the amount of the aforementioned electrolyte solution used for exposure of 1 g of deacylated gellan gum or salt thereof containing a divalent metal cation is generally not more than 50 ml, preferably not more than 25 ml, more preferably not more than 10 ml. In addition, the amount of the aforementioned electrolyte solution used for exposure of 1 g of deacylated gellan gum or salt thereof containing a divalent metal cation is generally not less than 0.5 ml, preferably not less than 1 ml, more preferably not less than 2 ml.

The method for exposing a macromolecular compound having an anionic functional group and containing a divalent metal cation to a solution of an electrolyte that releases an alkali metal ion is not particularly limited as long as the divalent metal cation can be removed from the macromolecular compound having an anionic functional group by the method of the present invention. In one embodiment, a macromolecular compound having an anionic functional group and containing a divalent metal cation is suspended in a solution of an electrolyte that releases an alkali metal ion, whereby the macromolecular compound is exposed to the solution of the electrolyte. Since the electrolyte is dissolved in the solution at a concentration at which the macromolecular compound is salted out, the macromolecular compound having an anionic functional group is not dissolved but is maintained in a slurry state. This embodiment is hereinafter sometimes to be referred to as "slurry washing". The "slurry" refers to a product in the form of a liquid or mud in which a powder is dispersed in a liquid such as water and the like.

In one embodiment, the macromolecular compound having an anionic functional group and containing a divalent metal cation is exposed to the solution of the electrolyte by passing the solution of the electrolyte that releases an alkali metal ion through a cake of the macromolecular compound. Since the electrolyte is dissolved in the solution at a concentration at which the macromolecular compound is salted out, the macromolecular compound having an anionic functional group is not dissolved even when the solution is passed through the cake but is maintained in a slurry state. This embodiment is hereinafter sometimes to be referred to as "cake washing". The "cake" refers to a product in which a powder containing water is formed into a solid shape by compression and the like with a filtration device. For example, a slurry (e.g., slurry after the above-mentioned slurry washing) of a macromolecular compound having an anionic functional group and containing a divalent metal cation is subjected to a filtration operation to form, on a filter, a cake of the macromolecular compound having an anionic functional group and containing a divalent metal cation, and an electrolyte solution is passed through the cake.

Subsequently to the above-mentioned exposure operation, an ion exchange reaction to exchange the divalent metal cation contained in the macromolecular compound having an anionic functional group with the alkali metal ion is performed. The alkali metal ion was released from the electrolyte that releases an alkali metal ion which was added to achieve the salting out conditions. In this ion exchange reaction, a divalent metal cation contained in a macromolecular compound having an anionic functional group in an undissolved state by salting out is replaced with an alkali metal ion in a solution of an electrolyte that releases an alkali metal ion. Therefore, using the method of the present invention, a divalent metal mixed in a macromolecular compound having an anionic functional group can be removed with higher volume efficiency as compared to the conventional method requiring dissolution in a solvent.

In the embodiment of slurry washing, a suspension is preferably stirred by an appropriate method and uniformly dispersed. It can be expected that the stirring prevents uneven distribution of undissolved macromolecular compounds having an anionic functional group and promotes the ion exchange reaction. While the stirring method is not particularly limited, for example, the suspension may be stirred using well-known techniques such as magnetic stirrer, mechanical stirrer, vortex mixer, shaker and the like.

The ion exchange reaction may be performed under heating conditions so that it will proceed efficiently, though it is not essential. The temperature at which the ion exchange reaction is performed is generally 4-90° C., preferably 10-80° C.

The reaction time can be appropriately determined in consideration of the kind of a macromolecular compound having an anionic functional group, the kind of an electrolyte that releases an alkali metal ion, the kind of the solvent to dissolve the electrolyte, reaction temperature, reaction volume, the amount of each reagent to be subjected to the reaction and the like. It is generally not less than 10 min, preferably not less than 30 min. The reaction time is generally not less than 10 min, preferably not less than 30 min. Theoretically, there is no upper limit on the reaction time. About 4 hours of reaction is generally sufficient. The amount (concentration) of divalent metal cation liberated from the macromolecular compound having an anionic functional group into the solution is measured over time, the progress of the ion exchange reaction is monitored, and the ion exchange reaction may be continued until an increase in free divalent metal cation is no longer observed.

After the ion exchange reaction, a macromolecular compound having an anionic functional group may be recovered from the reaction mixture. The content of the divalent metal cation in the recovered macromolecular compound having an anionic functional group is at least lower than that before the aforementioned ion exchange reaction. As described above, in the method of the present invention, the divalent metal cation is removed from the macromolecular compound in an undissolved state and having an anionic functional group, and the removed divalent metal cation is transferred to a solution used for salting out in which the electrolyte that releases an alkali metal ion is dissolved. Thus, a macromolecular compound having an anionic functional group and a reduced content of the divalent metal cation can be easily recovered in an undissolved state by removing the solution from the suspension with filtration, centrifugation, and the like.

The recovered macromolecular compound having an anionic functional group and reduced content of the divalent metal cation may be exposed again to the above-mentioned solution in which an electrolyte that releases an alkali metal ion is dissolved at a concentration at which the macromolecular compound is salted out, and an ion exchange reaction to exchange the divalent metal cation contained in the macromolecular compound with the alkali metal ion may be performed. By repeating exposure and ion exchange reaction multiple times, the content of the divalent metal cation in the macromolecular compound having an anionic functional group is expected to be further reduced.

Therefore, in one embodiment, the method of the present invention includes the following steps:

(1) exposing a macromolecular compound having an anionic functional group and containing a divalent metal cation to a solution in which an electrolyte that releases an alkali metal ion is dissolved at a concentration at which the macromolecular compound is salted out, (2) performing an ion exchange reaction to exchange the divalent metal cation contained in the macromolecular compound as with the alkali metal ion.

(3) recovering after the ion exchange reaction of step (2) the macromolecular compound having an anionic functional group and with a decreased amount of the divalent metal mixed therein from the reaction mixture, and (4) subjecting the macromolecular compound having an anionic functional group and the with a decreased amount of a divalent metal mixed therein, which is recovered in step (3) to step (1) again to repeat steps (1)-(3) multiple times to obtain a macromolecular compound having an anionic functional group and the with a decreased amount of a divalent metal mixed therein.

The number of repeats of steps (1) to (3) is not particularly limited. However, as the number of repeats is increased, further reduction of the content of the divalent metal cation in the macromolecular compound having an anionic functional group can be expected. Thus, it is, for example, not less than 2 times, preferably not less than 3 times, more preferably not less than 4 times. While there is no theoretical upper limit of the number of repeats, it is generally within 15 times, preferably within 10 times. For example, steps (1) to (3) are repeated until the content of calcium ion contained in the macromolecular compound having an anionic functional group reaches not more than 1000 ppm, preferably not more than 500 ppm, not more than 400 ppm, not more than 300 ppm, not more than 200 ppm, not more than 100 ppm, not more than 90 ppm, not more than 80 ppm, not more than 70 ppm, not more than 60 ppm or not more than 50 ppm.

Steps (1) to (3) may be repeated by the same exposure method, or steps (1) to (3) may be repeated by combining a plurality of different exposure methods. For example, steps (1) to (3) by slurry washing may be repeated a plurality of times; steps (1) to (3) by cake washing may be repeated a plurality of times; steps (1) to (3) by slurry washing may be performed at least once, and steps (1) to (3) by cake washing may be performed at least once. When slurry washing and cake washing are performed in combination, either may be performed first. That is, steps (1) to (3) by slurry washing may be performed at least once, and then steps (1) to (3) by cake washing may be performed at least once; or steps (1) to (3) by cake washing may be performed at least once, and then steps (1) to (3) by slurry washing may be performed at least once. Preferably, steps (1) to (3) by slurry washing are performed at least once, and then steps (1) to (3) by cake washing are performed at least once. By performing cake washing after slurry washing, a drastic reduction in the content of calcium ion contained in the macromolecular compound having an anionic functional group can be expected. When slurry washing and cake washing are performed in combination, the number of times the steps (1) to (3) by slurry washing are performed is not particularly limited, and is generally about 1 to 6 times, preferably 1, 2, 3 or 4 times. The number of times the steps (1) to (3) by cake washing are performed is not particularly limited, and is generally about 1 to 6 times, preferably 1, 2, 3 or 4 times. In a preferred embodiment, steps (1) to (3) by slurry washing are performed 1, 2, 3 or 4 times, and then steps (1) to (3) by cake washing are performed 1, 2, 3 or 4 times.

The electrolyte that releases an alkali metal ion used for salting out remains in the macromolecular compound having an anionic functional group recovered in the above-mentioned step (3) or (4). Thus, it is preferable to wash the recovered macromolecular compound having an anionic functional group and remove the remaining electrolyte that releases an alkali metal ion. The washing is preferably performed using a washing liquid in which a macromolecular compound having an anionic functional group is difficult to dissolve and an electrolyte that releases an alkali metal ion is easily dissolved. The washing liquid is preferably a mixture of water and lower alcohol (e.g., ethanol). The content of lower alcohol in the mixture of water and lower alcohol (e.g., ethanol) is, for example, 30-70% (v/v), preferably 40-60% (v/v) (e.g., 50% (v/v)). The washing liquid does not substantially contain calcium ion or magnesium ion, and preferably does not substantially contain divalent metal cation. The washing liquid preferably does not substantially contain an electrolyte that releases an alkali metal ion.

The amount of the washing liquid used for washing is not particularly limited as long as it can reduce the content of the remaining electrolyte that releases an alkali metal ion. It is generally not less than 0.5 ml, preferably not less than 1 ml, more preferably not less than 2 ml, per 1 g of a macromolecular compound having an anionic functional group. The upper limit of the amount of the washing liquid used for washing is not theoretically limited. It is generally not more than 50 ml, preferably not more than 25 ml, more preferably not more than 10 ml, per 1 g of a macromolecular compound having an anionic functional group.

The washing operation of a macromolecular compound having an anionic functional group is not particularly limited as long as the content of the remaining electrolyte that releases alkali metal ion can be reduced. In one embodiment, by suspending a macromolecular compound having an anionic functional group and containing the remaining electrolyte that releases an alkali metal ion in a washing liquid, the macromolecular compound is exposed to the washing liquid. Using a washing liquid in which a macromolecular compound having an anionic functional group is difficult to dissolve and an electrolyte that releases an alkali metal ion is easily dissolved, the remaining electrolyte that releases an alkali metal ion migrates and diffuses into the washing liquid while maintaining the macromolecular compound having an anionic functional group in a slurry state without dissolving. The washing operation can be performed according to the aforementioned "slurry washing".

In one embodiment, by passing a washing liquid through a cake of a macromolecular compound having an anionic functional group and containing the remaining electrolyte that releases an alkali metal ion, the macromolecular compound is exposed to the washing liquid. Using a washing liquid in which a macromolecular compound having an anionic functional group is difficult to dissolve and an electrolyte that releases an alkali metal ion is easily dissolved, the macromolecular compound having an anionic functional group is not dissolved but maintains the cake state even when the washing liquid is passed though the cake. The remaining electrolyte that releases an alkali metal ion migrates into the washing liquid and dissolves therein. The washing operation can be performed according to the aforementioned "cake washing".

After the washing step, a macromolecular compound having an anionic functional group may be recovered from the washed product. The content of the electrolyte that releases an alkali metal ion remaining in the recovered macromolecular compound having an anionic functional group is at least lower than that before the washing operation. As described above, in the above-mentioned washing step, an electrolyte that releases an alkali metal ion is removed from the macromolecular compound in an undissolved state and having an anionic functional group, and the removed electrolyte is transferred to a washing liquid. Thus, a macromolecular compound having an anionic functional group and a reduced content of the remaining electrolyte that releases an alkali metal ion can be easily recovered in an undissolved state by removing the washing liquid from the washed product by filtration, centrifugation, and the like.

The recovered macromolecular compound having an anionic functional group and a reduced content of the remaining electrolyte that releases an alkali metal ion may be subjected again to the washing step. By repeating the washing step multiple times, the content of the electrolyte that releases an alkali metal ion remaining in the macromolecular compound having an anionic functional group is expected to be further reduced.

The number of repeats of the washing step is not particularly limited. However, as the number of repeats is increased, further reduction of the content of the electrolyte that releases an alkali metal ion remaining in the macromolecular compound having an anionic functional group can be expected. Thus, it is, for example, not less than 2 times, preferably not less than 3 times. While there is no theoretical upper limit of the number of repeats, it is generally within 10 times, preferably within 5 times. For example, the washing step is repeated until the content of chlorine ion contained in an macromolecular compound having an anionic functional group reaches not more than 5000 ppm, preferably not more than 1000 ppm, not more than 500 ppm, not more than 400 ppm, not more than 300 ppm, not more than 200 ppm or not more than 100 ppm.

The washing step may be repeated by the same washing method, or the washing step may be repeated by combining a plurality of different washing methods. For example, the washing step by slurry washing may be repeated a plurality of times; the washing step by cake washing may be repeated a plurality of times; the washing step by slurry washing may be performed at least once, and the washing step by cake washing may be performed at least once. When slurry washing and cake washing are performed in combination, either may be performed first. That is, the washing step by slurry washing may be performed at least once, and then the washing step by cake washing may be performed at least once; or the washing step by cake washing may be performed at least once, and then the washing step by slurry washing may be performed at least once. Preferably, the washing step by slurry washing is performed at least once, and then the washing step by cake washing is performed at least once. By performing cake washing after slurry washing, a drastic reduction in the content of the electrolyte that releases an alkali metal ion remaining in a macromolecular compound having an anionic functional group can be expected. When slurry washing and cake washing are performed in combination, the number of times the washing step by slurry washing is performed is not particularly limited, and is generally about 1 to 4 times, preferably 1, 2 or 3 times. The number of times the washing step by cake washing is performed is not particularly limited, and is generally about 1 to 4 times, preferably 1, 2 or 3 times. In a preferred embodiment, the washing step by slurry washing is performed 1, 2 or 3 times, and then the washing step by cake washing is performed 1, 2 or 3 times.

After washing, the recovered macromolecular compound having an anionic functional group is dried by an evaporator or the like, whereby a dry powder of the macromolecular compound having an anionic functional group and a reduced content of the divalent metal cation can be obtained. In one embodiment, the content of calcium ion contained in the recovered macromolecular compound having an anionic functional group is not more than 1000 ppm, preferably not more than 500 ppm, not more than 400 ppm, not more than 300 ppm, not more than 200 ppm, not more than 100 ppm, not more than 90 ppm, not more than 80 ppm, not more than 70 ppm, not more than 60 ppm or not more than 50 ppm. In one embodiment, the content of magnesium ion contained in the recovered macromolecular compound having an anionic functional group is not more than 200 ppm, preferably not more than 150 ppm, not more than 120 ppm, not more than 100 ppm, not more than 90 ppm, not more than 80 ppm, not more than 70 ppm or not more than 60 ppm. The macromolecular compound having an anionic functional group obtained by the above-mentioned method shows a reduced content of divalent metal cation, and therefore, the solubility in water is increased compared to that before treatment. Particularly, when the calcium ion content is reduced to 1000 ppm or below, the compound is expected to be easily dissolved in cold water without requiring a heat treatment such as an autoclave treatment and other treatments. In addition, a three-dimensional network of the anionic macromolecular compound assembled via calcium ion is not easily formed when dissolved in pure water, and the obtained aqueous solution is expected to be easily sterilized by filtration through a filter.

Furthermore, the content of chlorine ion contained in the macromolecular compound having an anionic functional group can be reduced to, for example, not more than 5000 ppm, preferably not more than 1000 ppm, not more than 500 ppm, not more than 400 ppm, not more than 300 ppm, not more than 200 ppm or not more than 100 ppm by performing the above-mentioned washing step.

In a preferred embodiment, the present invention provides a method for removing calcium ion and/or magnesium ion from deacylated gellan gum or salt thereof containing calcium ion and/or magnesium ion, including (1) exposing deacylated gellan gum or salt thereof containing calcium ion and/or magnesium ion to water, or a mixture of water and ethanol, in which sodium chloride is dissolved at a concentration at which the deacylated gellan gum or a salt thereof is salted out, and (2) performing an ion exchange reaction to exchange calcium ion and/or magnesium ion contained in the deacylated gellan gum or a salt thereof with sodium ion.

The content of calcium ion contained in the deacylated gellan gum or a salt thereof subjected to the method of the present invention is not particularly limited as long as the calcium ion can be removed by the method of the present invention. It is generally not less than 100 ppm, preferably not less than 200 ppm, not less than 300 ppm, not less than 400 ppm, not less than 500 ppm, not less than 1000 ppm, not less than 1100 ppm, not less than 1200 ppm, not less than 1500 ppm, not less than 2500 ppm, not less than 3000 ppm or not less than 3500 ppm. The upper limit of the calcium ion content is not particularly limited as long as the calcium ion can be removed by the method of the present invention. It is generally not more than 10000 ppm, preferably not more than 5000 ppm.

The content of magnesium ion contained in the deacylated gellan gum or a salt thereof subjected to the method of this embodiment is not particularly limited as long as the magnesium ion can be removed by the method of the present invention. It is generally not less than 100 ppm, preferably not less than 200 ppm, not less than 500 ppm, not less than 1000 ppm or not less than 1500 ppm. The upper limit of the magnesium ion content is not particularly limited as long as the magnesium ion can be removed by the method of the present invention. It is generally not more than 5000 ppm, preferably not more than 2500 ppm.

The contents of calcium ion and magnesium ion contained in the deacylated gellan gum or a salt thereof subjected to the method of this embodiment are not particularly limited as long as the calcium ion and magnesium ion can be removed by the method of the present invention. The calcium ion content is generally not less than 100 ppm, preferably not less than 200 ppm, not less than 300 ppm, not less than 400 ppm, not less than 500 ppm, not less than 1000 ppm, not less than 1100 ppm, not less than 1200 ppm, not less than 1500 ppm, not less than 2500 ppm, not less than 3000 ppm or not less than 3500 ppm, and the magnesium ion content is generally not less than 100 ppm, preferably not less than 200 ppm, not less than 500 ppm, not less than 1000 ppm or not less than 1500 ppm. The upper limits of the calcium ion and magnesium ion contents are not particularly limited as long as the calcium ion and magnesium ion can be removed by the method of the present invention. The calcium ion content is generally not more than 10000 ppm, preferably not more than 5000 ppm and the magnesium ion content is generally not more than 5000 ppm, preferably not more than 2500 ppm.

In this embodiment, the solvent that dissolves sodium chloride is water or a mixture of water and ethanol. The higher the content of ethanol, the more the salting out (precipitation) of deacylated gellan gum is promoted. However, the solubility of sodium chloride decreases and efficiency of the ion exchange reaction declines. Therefore, the content of ethanol in the mixture of water and ethanol is preferably a content that can achieve both promotion of salting out and ion exchange reaction. When a mixture of water and ethanol is used, the content of ethanol in the mixture is preferably not more than 70% (v/v), preferably not more than 60% (v/v), more preferably not more than 50% (v/v), and preferably not less than 1% (v/v), more preferably not less than 5% (v/v), further preferably not less than 10% (v/v).

In one embodiment, the concentration of sodium chloride in the solution is, for example, not less than 10% (w/v), preferably not less than 15% (w/v), more preferably not less than 20% (w/v), most preferably not less than 25% (w/v). The concentration of sodium chloride in the solution may be not more than the saturation concentration.

The sodium chloride solution does not substantially contain calcium ion or magnesium ion. Preferably, the sodium chloride solution does not substantially contain divalent metal cation.

A deacylated gellan gum or salt thereof containing calcium ion and/or magnesium ion is exposed to a solution of sodium chloride by adding either the solution of sodium chloride or the deacylated gellan gum or salt thereof containing calcium ion and/or magnesium ion to the other. Preferably, solid deacylated gellan gum or salt thereof containing calcium ion and/or magnesium ion (e.g., a powder of deacylated gellan gum or salt thereof containing calcium ion and/or magnesium ion) is exposed to a solution of sodium chloride. In one embodiment, dried solid deacylated gellan gum or salt thereof containing calcium ion and/or magnesium ion (e.g., a dry powder of deacylated gellan gum or salt thereof containing calcium ion and/or magnesium ion) is exposed to a solution of sodium chloride. Since the solution contains sodium chloride at a salting out concentration, at least a part of the added deacylated gellan gum or salt thereof containing calcium ion and/or magnesium ion remains in a solid (e.g., powder) state without dissolving. Here, dissolution of a part of the deacylated gellan gum or salt thereof containing calcium ion and/or magnesium ion exposed to a solution of sodium chloride is not prevented.

In one embodiment, the amount of sodium chloride solution used for exposure of 1 g of deacylated gellan gum and/or a salt thereof containing calcium ion and/or magnesium ion is generally not more than 50 ml, preferably not more than 25 ml, more preferably not more than 10 ml. The amount of sodium chloride solution used for exposure of 1 g of deacylated gellan gum and/or a salt thereof containing calcium ion and/or magnesium ion is generally not less than 0.5 ml, preferably not less than 1 ml, more preferably not less than 2 ml.

The method for exposing deacylated gellan gum or salt thereof containing calcium ion and/or magnesium ion to a solution of sodium chloride is not particularly limited as long as the calcium ion and/or magnesium ion can be removed from the deacylated gellan gum or a salt thereof by the method of the present invention. In one embodiment, deacylated gellan gum or salt thereof containing calcium ion and/or magnesium ion is suspended in a solution of sodium chloride, whereby the gellan gum or a salt thereof is exposed to the solution of sodium chloride.

In one embodiment, sodium chloride solution is passed through a cake of deacylated gellan gum or salt thereof containing calcium ion and/or magnesium ion, whereby the deacylated gellan gum or a salt thereof is exposed to the sodium chloride solution. For example, a slurry of deacylated gellan gum or salt thereof containing calcium ion and/or magnesium ion is subjected to a filtration operation to form, on a filter, a cake of the deacylated gellan gum or salt thereof containing calcium ion and/or magnesium ion, and a sodium chloride solution is passed through the cake.

Subsequently to the above-mentioned exposure operation, an ion exchange reaction to exchange calcium ion and/or magnesium ion contained in the deacylated gellan gum or a salt thereof with sodium ion is performed. The sodium ion was released from sodium chloride which was added to achieve the salting out conditions. In this ion exchange reaction, calcium ion and/or magnesium ion contained in the deacylated gellan gum or a salt thereof in an undissolved state by salting out is/are replaced with sodium ion in a solution of sodium chloride. Therefore, using the method of the present invention, calcium ion and/or magnesium ion mixed in deacylated gellan gum or a salt thereof can be removed with higher volume efficiency as compared to the conventional method requiring dissolution in a solvent.

The ion exchange reaction may be performed under heating conditions so that it will proceed efficiently, though it is not essential. The temperature at which the ion exchange reaction is performed is generally 4-90° C., preferably 10-80° C.

The reaction time is generally not less than 10 min, preferably not less than 30 min. Theoretically, there is no upper limit on the reaction time. About 4 hours of reaction is generally sufficient. The amount (concentration) of calcium ion and/or magnesium ion liberated into a solution of deacylated gellan gum or a salt thereof is measured over time, the progress of the ion exchange reaction is monitored, and the ion exchange reaction may be continued until an increase in free calcium ion and/or magnesium ion is no longer observed.

After the ion exchange reaction, deacylated gellan gum or a salt thereof may be recovered from the reaction mixture. The content of calcium ion and/or magnesium ion in the recovered deacylated gellan gum or a salt thereof is at least lower than that before the aforementioned ion exchange reaction.

The recovered deacylated gellan gum or a salt thereof with a reduced content of calcium ion and/or magnesium ion may be exposed again to the above-mentioned sodium chloride solution, and an ion exchange reaction to exchange the calcium ion and/or magnesium ion contained in the deacylated gellan gum or a salt thereof with the sodium ion may be performed. By repeating exposure and ion exchange reaction multiple times, the content of the calcium ion and/or magnesium ion in the deacylated gellan gum or a salt thereof is expected to be further reduced.

Therefore, in one embodiment, the method of the present invention includes the following steps:

(1) exposing deacylated gellan gum or salt thereof containing calcium ion and/or magnesium ion to water, or a mixture of water and ethanol, in which sodium chloride is dissolved at a concentration at which the deacylated gellan gum or a salt thereof is salted out, (2) performing an ion exchange reaction to exchange calcium ion and/or magnesium ion contained in the deacylated gellan gum or a salt thereof with sodium ion, (3) recovering deacylated gellan gum or a salt thereof with a reduced content of calcium ion and/or magnesium ion from the reaction mixture after the ion exchange reaction in step (2), and (4) repeating steps (1) to (3) multiple times by subjecting the deacylated gellan gum or a salt thereof with a reduced content of calcium ion and/or magnesium ion mixed therein and recovered in step (3) to step (1) again to obtain deacylated gellan gum or a salt thereof with a reduced content of calcium ion and/or magnesium ion mixed therein.

The number of repeats of steps (1) to (3) is, for example, not less than 2 times, preferably not less than 3 times, more preferably not less than 4 times. While there is no theoretical upper limit of the number of repeats, it is generally within 15 times, preferably within 10 times. For example, steps (1) to (3) are repeated until the content of calcium ion contained in the deacylated gellan gum or a salt thereof reaches not more than 1000 ppm, preferably not more than 500 ppm, not more than 400 ppm, not more than 300 ppm, not more than 200 ppm, not more than 100 ppm, not more than 90 ppm, not more than 80 ppm, not more than 70 ppm, not more than 60 ppm or not more than 50 ppm.

Steps (1) to (3) may be repeated by the same exposure method, or steps (1) to (3) may be repeated by combining a plurality of different exposure methods. For example, steps (1) to (3) by slurry washing may be repeated a plurality of times; steps (1) to (3) by cake washing may be repeated a plurality of times; steps (1) to (3) by slurry washing may be performed at least once, and steps (1) to (3) by cake washing may be performed at least once. When slurry washing and cake washing are performed in combination, either may be performed first. That is, steps (1) to (3) by slurry washing may be performed at least once, and then steps (1) to (3) by cake washing may be performed at least once; or steps (1) to (3) by cake washing may be performed at least once, and then steps (1) to (3) by slurry washing may be performed at least once. Preferably, steps (1) to (3) by slurry washing are performed at least once, and then steps (1) to (3) by cake washing are performed at least once. By performing cake washing after slurry washing, a drastic reduction in the content of calcium ion contained in the deacylated gellan gum or a salt thereof can be expected. When slurry washing and cake washing are performed in combination, the number of times the steps (1) to (3) by slurry washing are performed is not particularly limited, and is generally about 1 to 6 times, preferably 1, 2, 3 or 4 times. The number of times the steps (1) to (3) by cake washing are performed is not particularly limited, and is generally about 1 to 6 times, preferably 1, 2, 3 or 4 times. In a preferred embodiment, steps (1) to (3) by slurry washing are performed 1, 2, 3 or 4 times, and then steps (1) to (3) by cake washing are performed 1, 2, 3 or 4 times.

Sodium chloride for salting out remains in the deacylated gellan gum or a salt thereof recovered in the above-mentioned step (3) or (4). Thus, it is preferable to wash the recovered sodium chloride and remove the remaining sodium chloride. The washing liquid is preferably a mixture of water and ethanol. The content of ethanol in the mixture of water and ethanol is, for example, 30-70% (v/v), preferably 40-60% (v/v) (e.g., 50% (v/v)). The washing liquid does not substantially contain calcium ion or magnesium ion, and preferably does not substantially contain divalent metal cation. In addition, the washing liquid preferably does not substantially contain sodium chloride.

The amount of the washing liquid used for washing is generally not less than 0.5 ml, preferably not less than 1 ml, more preferably not less than 2 ml, per 1 g of deacylated gellan gum or a salt thereof. The upper limit of the amount of the washing liquid used for washing is not theoretically limited. It is generally not more than 50 ml, preferably not more than 25 ml, more preferably not more than 10 ml, per 1 g of deacylated gellan gum or a salt thereof.

In one embodiment, deacylated gellan gum or salt thereof containing the remaining sodium chloride is exposed to a washing liquid by suspending the deacylated gellan gum or a salt thereof in the washing liquid. Using a washing liquid in which deacylated gellan gum or a salt thereof is difficult to dissolve and sodium chloride is easily dissolved, deacylated gellan gum or a salt thereof does not dissolve but maintains a slurry state and the remaining sodium chloride migrates and diffuses into the washing liquid.

In one embodiment, by passing a washing liquid through a cake of deacylated gellan gum or salt thereof containing the remaining sodium chloride, the deacylated gellan gum or a salt thereof is exposed to the washing liquid. Using a washing liquid in which deacylated gellan gum or a salt thereof is difficult to dissolve and sodium chloride is easily dissolved, the deacylated gellan gum or a salt thereof is not dissolved but maintains the cake state even when the washing liquid is passed though the cake, and the remaining sodium chloride migrates and dissolves into the washing liquid.

After the washing step, a deacylated gellan gum or a salt thereof may be recovered from the washed product. The content of sodium chloride remaining in the recovered deacylated gellan gum or a salt thereof is at least lower than that before the washing operation. As described above, in the above-mentioned washing step, sodium chloride is removed from the deacylated gellan gum or a salt thereof in an undissolved state, and the removed sodium chloride is transferred to a washing liquid. Thus, a deacylated gellan gum or a salt thereof with a reduced content of the remaining sodium chloride can be easily recovered in an undissolved state by removing the washing liquid from the washed product by filtration, centrifugation, and the like.

The recovered deacylated gellan gum or a salt thereof with a reduced content of sodium chloride may be subjected again to the washing step. By repeating the washing step multiple times, the content of sodium chloride remaining in the deacylated gellan gum or a salt thereof is expected to be further reduced.

The number of repeats of the washing step is, for example, not less than 2 times, preferably not less than 3 times, more preferably not less than 4 times. While there is no theoretical upper limit of the number of repeats, it is generally within 10 times, preferably within 5 times. For example, the washing step is repeated until the content of chlorine ion contained in the deacylated gellan gum or a salt thereof reaches not more than 5000 ppm, preferably not more than 1000 ppm, not more than 500 ppm, not more than 400 ppm, not more than 300 ppm, not more than 200 ppm or not more than 100 ppm.

The washing step may be repeated by the same washing method, or the washing step may be repeated by combining a plurality of different washing methods. For example, the washing step by slurry washing may be repeated a plurality of times; the washing step by cake washing may be repeated a plurality of times; the washing step by slurry washing may be performed at least once, and the washing step by cake washing may be performed at least once. When slurry washing and cake washing are performed in combination, either may be performed first. That is, the washing step by slurry washing may be performed at least once, and then the washing step by cake washing may be performed at least once; or the washing step by cake washing may be performed at least once, and then the washing step by slurry washing may be performed at least once. Preferably, the washing step by slurry washing is performed at least once, and then the washing step by cake washing is performed at least once. By performing cake washing after slurry washing, a drastic reduction in the content of sodium chloride remaining in deacylated gellan gum or a salt thereof can be expected. When slurry washing and cake washing are performed in combination, the number of times the washing step by slurry washing is performed is not particularly limited, and is generally about 1 to 4 times, preferably 1, 2 or 3 times. The number of times the washing step by cake washing is performed is not particularly limited, and is generally about 1 to 4 times, preferably 1, 2 or 3 times. In a preferred embodiment, the washing step by slurry washing is performed 1, 2 or 3 times, and then the washing step by cake washing is performed 1, 2 or 3 times.

After washing, the recovered deacylated gellan gum or a salt thereof is dried by an evaporator or the like, whereby a dry powder of the deacylated gellan gum or a salt thereof with a reduced content of calcium ion and/or magnesium ion can be obtained. In one embodiment, the content of calcium ion contained in the recovered deacylated gellan gum or a salt thereof is not more than 1000 ppm, preferably not more than 500 ppm, not more than 400 ppm, not more than 300 ppm, not more than 200 ppm, not more than 100 ppm, not more than 90 ppm, not more than 80 ppm, not more than 70 ppm, not more than 60 ppm or not more than 50 ppm. In one embodiment, the content of magnesium ion contained in the recovered deacylated gellan gum or a salt thereof is not more than 200 ppm, preferably not more than 150 ppm, not more than 120 ppm, not more than 100 ppm, not more than 90 ppm, not more than 80 ppm, not more than 70 ppm or not more than 60 ppm. The deacylated gellan gum or a salt thereof obtained by the above-mentioned method shows a reduced content of calcium ion and/or magnesium ion, and therefore, the solubility in water is increased compared to that before treatment. Particularly, when the calcium ion content is reduced to 1000 ppm or below, the compound is expected to be easily dissolved in cold water without requiring a heat treatment such as an autoclave treatment and other treatments. In addition, a three-dimensional network of the anionic macromolecular compound assembled via calcium ion is not easily formed when dissolved in pure water, and the obtained aqueous solution is expected to be easily sterilized by filtration through a filter.

Furthermore, the content of chlorine ion contained in the deacylated gellan gum or a salt thereof can be reduced to not more than 5000 ppm, preferably not more than 1000 ppm, not more than 500 ppm, not more than 400 ppm, not more than 300 ppm, not more than 200 ppm or not more than 100 ppm by performing the above-mentioned washing step.

By dissolving a macromolecular compound having an anionic functional group and a reduced content of the divalent metal cation (e.g., deacylated gellan gum or a salt thereof), which is obtained by the method of the present invention, in a physiological aqueous solvent, a solution of the macromolecular compound having an anionic functional group (e.g., deacylated gellan gum or a salt thereof) can be prepared. The present invention also provides a preparation method of such a solution of a macromolecular compound having an anionic functional group (e.g., deacylated gellan gum or a salt thereof). A macromolecular compound having an anionic functional group and a reduced content of the divalent metal cation (e.g., deacylated gellan gum or a salt thereof) obtained by the method of the present invention has high solubility in water and can be dissolved in an aqueous solvent without requiring a heat treatment. Particularly, it is possible to produce an aqueous solution of deacylated gellan gum or a salt thereof at a high concentration of 1.0-1.5% (w/v) (commercially available DAG has a drawback of poor operability since it not only essentially requires a heat treatment for dissolution, but also becomes gel at a high concentration of 1.0% (w/v) or more by dissolution by a heat treatment followed by allowing to cool to room temperature). The temperature during dissolution is, for example, 0-60° C., preferably 4-40° C., further preferably 4-30° C. Examples of the aqueous solvent include, but are not limited to, water, a mixture of water and dimethyl sulfoxide (DMSO), and the like. As the aqueous solvent, water is preferable. The aqueous solvent may contain an appropriate buffering agent and salts. The aqueous solvent does not substantially contain calcium ion or magnesium ion, and preferably does not substantially contain divalent metal cation. When the divalent metal cation is not substantially contained in the aqueous solvent, a macromolecular compound having an anionic functional group is not crosslinked via divalent metal cation, and does not form an irregular structure with ease. Accordingly, it is possible to preserve the compound stably by dissolving in an aqueous solvent. The concentration of a macromolecular compound having an anionic functional group in an aqueous solution is not particularly limited as long as the macromolecular compound can be dissolved stably. It is, for example, 0.0001-1.5% (w/v), preferably 0.01-0.5% (w/v), more preferably 0.01-0.3% (w/v).

Additives that increase the effect of a macromolecular compound having an anionic functional group or lower the concentration at the time of use can be further added to the above-mentioned solution. As an example of such additive, one or more kinds of polysaccharides such as guar gum, tamarind gum, propylene glycol alginate, locust bean gum, gum arabic, tara gum, tamarind gum, methylcellulose and the like can be mixed.

A solution of a macromolecular compound having an anionic functional group may be sterilized (filtration, autoclave sterilization etc.). Preferably, filtration sterilization is used. The size of fine pore (pore size) in the filtration sterilization is generally 0.1-10 μm, preferably, 0.1-1 μm, more preferably 0.1-0.5 μm, further preferably 0.1-0.22 μm, most preferably 0.1 μm. When a macromolecular compound having an anionic functional group and a reduced content of the divalent metal cation (e.g., deacylated gellan gum or a salt thereof), which is obtained by the method of the present invention, is dissolved in water that does not substantially contain calcium ion or magnesium ion (preferably water that does not substantially contain divalent metal cation), the macromolecular compound (e.g., deacylated gellan gum or a salt thereof) is not crosslinked via divalent metal cation in the aqueous solution and does not easily form an irregular structure. Therefore, sterilization by filtration with a low-viscosity filter with a small pore size can be performed easily. For example, in the case of an aqueous solution in which deacylated gellan gum or a salt thereof with a reduced content of divalent metal cation, which is obtained by the method of the present invention, is dissolved in water that does not substantially contain calcium ion or magnesium ion (preferably water that does not substantially contain divalent metal cation), the aqueous solution with a high concentration of 1.0-1.5% (w/v) can be easily sterilized with a filter of pore size 0.1 μm.

When a solution of a macromolecular compound having an anionic functional group (e.g., deacylated gellan gum or a salt thereof) prepared as mentioned above is mixed with a liquid medium, the macromolecular compound is crosslinked via divalent metal cation (e.g., calcium ion) in the liquid medium, and a three-dimensional network (irregular structure) dispersed in water is formed. When cells are cultured in a liquid medium containing this three-dimensional network, the three-dimensional network functions as a carrier for suspending the cells, and the cells in the medium are trapped in the three-dimensional network and do not sink. Thus, the cells can be cultured while being uniformly dispersed in a suspended state (static suspension culture) without requiring shaking, a rotating operation or the like. In addition, since the aforementioned three-dimensional network can be formed without substantially increasing the viscosity of the liquid medium, a medium composition containing the three-dimensional network is also superior in operability in passages and the like (WO 2014/017513, US-A-2014/0106348).

In addition, since a macromolecular compound having an anionic functional group and a reduced content of the divalent metal cation (e.g., deacylated gellan gum or a salt thereof), which is obtained by the method of the present invention, has superior water solubility, it can also be used in the field of the production of foods, pharmaceutical product, cosmetics, quasi-drugs and the like.

The present invention is explained in more detail in the following by illustrating the Examples of the medium composition of the present invention. However, the present invention is not limited thereby.

EXAMPLES

Metal ions in the sample were quantified with an inductively coupled plasma-atomic emission spectrometer (ICP-OES; SPS 5520, manufactured by SII NanoTechnology Inc.).

[Example 1] (Using Electrolyte Solution Containing Ethanol)

In a glass flask were added pure water (50 mL), ethanol (50 mL), sodium chloride (10 g), and the mixture was dissolved at room temperature. Thereto was added deacylated gellan gum (DAG, San-Ei Gen F.F.I., Inc.) (10 g) as a powder, and sufficiently suspended by stirring. The suspension was heated to 50° C. and further stirred at 50° C. for 1 hr (slurry washing). The suspension was cooled to room temperature, and a filtration operation was performed under reduced pressure to give a cake of white powder on the filter paper. This cake was washed with ethanol/pure water (50 mL/50 mL) on the filter paper, and dried under reduced pressure at room temperature to give deacylated gellan gum with a reduced content of divalent metal cation as a white powder. The amounts of metal ion and chloride ion contained in the obtained powder are shown in Table 1.

Comparative Example 1

In the same manner as in the above-mentioned method except that sodium chloride was reduced to 1 g, a powder of deacylated gellan gum was obtained. The amounts of metal ion and chloride ion contained in the obtained powder are shown in Table 1.

TABLE 1

| | NaCl (g) | Al (ppm) | Ca (ppm) | Fe (ppm) | K (ppm) | Mg (ppm) | Mn (ppm) | Na (ppm) | Cl (ppm) |
|---|---|---|---|---|---|---|---|---|---|
| Ex. 1 | 10 | 160 | 980 | 53 | 3300 | 140 | 3.4 | 26000 | 3200 |
| Com. Ex. 1 | 1 | 160 | 2400 | 54 | 17000 | 530 | 5.9 | 16000 | 160 |

From the results shown in Table 1, it was found that metal ion was exchanged even under conditions where deacylated gellan gum was not completely dissolved, and the amount of calcium ion in deacylated gellan gum decreases more when the concentration of sodium chloride in the solution is higher.

[Example 2]-[Example 6] (Using Solution of Electrolyte not Containing Ethanol)

In a glass flask was added saturated brine (100 mL) and thereto was added deacylated gellan gum (DAG, San-Ei Gen F.F.I., Inc.) in the amount shown in Table 1 (10 g or 20 g) as a powder. After sufficiently suspending by stirring, the suspension was heated to the temperature shown in Table 1, and further stirred at the same temperature for the time shown in Table 1 (slurry washing). The suspension was cooled to room temperature, and a filtration operation was performed under reduced pressure to give a cake of white powder on the filter paper. This cake was placed back in the flask, suspension washed with ethanol/pure water (50 mL/50 mL), and the filtration operation was performed again under reduced pressure to remove sodium chloride remaining in the cake. The above-mentioned washing operation was performed once again, and the cake was dried under reduced pressure at room temperature to give deacylated gellan gum with a reduced content of divalent metal cation as a white powder. The amounts of metal ion and chloride ion contained in the obtained powder are shown in Table 2.

TABLE 2

|  | DAG (g) | temperature (° C.) | time (h) | Al (ppm) | Ca (ppm) | Fe (ppm) | K (ppm) | Mg (ppm) | Mn (ppm) | Na (ppm) | Cl (ppm) |
| --- | --- | --- | --- | --- | --- | --- | --- | --- | --- | --- | --- |
| Ex. 2 | 10 | 80 | 0.5 | 78 | 440 | 27 | 860 | 57 | 1.1 | 20000 | 15 |
| Ex. 3 | 10 | 80 | 1 | 93 | 520 | 30 | 950 | 68 | 1.3 | 22000 | 26 |
| Ex. 4 | 10 | 50 | 2 | 98 | 500 | 31 | 1100 | 69 | <2 | 23000 | 22 |
| Ex. 5 | 10 | 30 | 2 | 72 | 410 | 25 | 940 | 60 | 1.2 | 20000 | 34 |
| Ex. 6 | 20 | 50 | 2 | 86 | 530 | 29 | 1700 | 82 | <2 | 16000 | 160 |

From the results shown in Table 2, it was found that metal ion is exchanged and the content of calcium ion in deacylated gellan gum decreases without dissolution or swelling of the deacylated gellan gum even when a solution of electrolyte not containing ethanol (saturated brine) was used.

[Experimental Example 1]-[Experimental Example 6], [Comparative Example 2] and [Comparative Example 3] A549 Cell Proliferation Test (Preparation of Medium)

The deacylated gellan gum (100 mg) with decreased divalent metal cation, which was obtained in Example 1, was dissolved in 10 mL of pure water and sterilized by filtration to give 1% (w/v) aqueous solution. For the preparation of the medium, a medium preparation kit (Nissan Chemical Industries Ltd. FCeM™-series Preparation Kit) was used. To be specific, a predetermined amount of medium was dispensed in a conical tube (Sumitomo Bakelite Co., Ltd. 50 mL centrifuge tube), and an adapter cap, which is a component of the kit, was attached. The tip of a disposable syringe filled with a predetermined amount of deacylated gellan gum aqueous solution was connected by fitting into a cylindrical part of the adapter cap, and the plunger of the syringe was pressed manually to vigorously inject the deacylated gellan gum aqueous solution in the syringe into the container to achieve contact with the medium, whereby the medium composition was prepared. The concentration of the deacylated gellan gum in the medium was adjusted to be 0.0001% (w/v), 0.007% (w/v), 0.010% (w/v), 0.015% (w/v), 0.020% (w/v) or 0.030% (w/v).

(Cell Proliferation Test)

Adenocarcinomic human alveolar basal epithelial cells in logarithmic growth phase (A549, DS Pharma Biomedical Co., Ltd.) ($64.8 \times 10^4$ cells) were prepared, centrifuged (300× g, 3 min) to remove supernatant, medium compositions containing the deacylated gellan gum prepared in Example 1 at various concentrations (Experimental Example 1-Experimental Example 6 in Table 3), a medium composition completely free of deacylated gellan gum (Comparative Example 2 in Table 3), and a medium composition containing deacylated gellan gum free of the treatment of Example 1 (Comparative Example 3 in Table 3) were added by 8 mL and gently stirred to prepare cell suspensions ($3 \times 10^4$ cells/mL). A cell suspension containing $0.3 \times 10^4$ cells was added to a 96-well U-bottom cell culture plate (manufactured by Sumitomo Bakelite Co., Ltd., MS-309UR) at 0.1 mL per well, and cultured under the conditions of 37° C., 5% carbon dioxide gas for 7 days. The amount of ATP contained in the cells before and after the culture was measured with a plate reader (manufactured by Tecan, infiniteM200PRO) using CellTiter-Glo Luminescent Cell Viability Assay (Promega KK, G7571) as an index of the number of cells, and Relative Light Unit (RLU) was compared. All the above tests were conducted 6 times, and the average values are shown in Table 3 and FIG. 1.

TABLE 3

|  | Exp. Ex. 1 | Exp. Ex. 2 | Exp. Ex. 3 | Exp. Ex. 4 | Exp. Ex. 5 | Exp. Ex. 6 | Com. Ex. 2 | Com. Ex. 3 |
| --- | --- | --- | --- | --- | --- | --- | --- | --- |
| gellan gum concentration | 0.005(%) | 0.007 | 0.010 | 0.015 | 0.020 | 0.030 | 0 | 0.015 |
| 0 d | 97600 | 99712 | 101841 | 97306 | 102758 | 101074 | 83134 | 106566 |
| 2 d | 204456 | 195096 | 185763 | 165236 | 202147 | 194321 | 153785 | 183724 |
| 5 d | 549567 | 602415 | 552671 | 554897 | 630139 | 661577 | 309701 | 645770 |
| 7 d | 1022916 | 1055979 | 1034281 | 1002067 | 1223984 | 1155214 | 408368 | 1090816 |

Note that "0 d" described in Table 3 and FIG. 1 means "start of culture (day 0)", and "2 d", "5 d" and "7 d" respectively mean "after 2 days of culture", "after 5 days of culture" and "after 7 days of culture". The unit of the numerical values indicated in the line of "gellan gum concentration" in Table 3 is % (w/v), and the numerical values indicated in the lines of "0 d", "2 d", "5 d" and "7 d" show the average value of Relative Light Unit (RLU). The numerical values in the vertical axis of FIG. 1 show the average value of Relative Light Unit (RLU). In FIG. 1, "0.005" and the like on the horizontal axis show gellan gum concentration (unit: % (w/v)) in each Experimental Example. The four bar graphs for each Experimental Example in FIG. 1 respectively show the results of "0 d", "2 d", "5 d" and "7 d" from the left.

As shown in Table 3 and FIG. 1, even when a medium composition containing a deacylated gellan gum in which divalent metal cation was decreased by the method of the present invention was used, cell proliferation equivalent to that of an untreated composition (Comparative Example 3) was achieved.

[Example 7] (Using Solution of Electrolyte Containing Potassium Chloride) and [Comparative Example 4] (Commercially Available Deacylated Gellan Gum)

In a glass flask were added pure water (150 mL) and potassium chloride (50 g), and the mixture was dissolved at room temperature. Thereto was added deacylated gellan gum (DAG, San-Ei Gen F.F.I., Inc.) (20 g) as a powder and sufficiently suspended by stirring. The suspension was heated to 50° C. and further stirred at 50° C. for 1 hr (slurry washing). The suspension was cooled to room temperature, and a filtration operation was performed under reduced pressure to give a white powder on the filter paper. This cake was placed back in the flask, suspension washed with a mixture of ethanol/pure water (84 mL/83 mL) for 30 min, and the filtration operation was performed again under reduced pressure to remove potassium chloride remaining in the cake. The above-mentioned washing operation was performed once again, and the cake was dried under reduced pressure at room temperature to give deacylated gellan gum with a reduced content of divalent metal cation as a white powder (Example 7). The amounts of metal ion and chloride ion contained in the obtained powder (Example 7) and commercially available deacylated gellan gum (Comparative Example 4) are shown in Table 4.

TABLE 4

|  | Al (ppm) | Ca (ppm) | Fe (ppm) | K (ppm) | Mg (ppm) | Mn (ppm) | Na (ppm) | Cl (ppm) |
| --- | --- | --- | --- | --- | --- | --- | --- | --- |
| Ex. 7 | 170 | 690 | 47 | 50000 | 81 | 2 | 210 | 6100 |
| Com. Ex. 4 (deacylated gellan gum) | 160 | 3800 | 43 | 40000 | 970 | 7 | 4600 | 170 |

From the results shown in Table 4, it was found that metal ion is exchanged and the contents of calcium ion and magnesium ion in deacylated gellan gum decrease without dissolution or swelling of the deacylated gellan gum even when potassium chloride that liberates potassium ion rather than sodium ion was used as the alkali metal ion.

[Example 8]-[Example 12] (Consideration of Temperature) and [Comparative Example 4] (Commercially Available Deacylated Gellan Gum)

In a glass flask were added pure water (60 mL or 75 mL) and sodium chloride (20 g or 25 g), and the mixture was dissolved at room temperature. Thereto was added deacylated gellan gum (DAG, San-Ei Gen F.F.I., Inc.) in the amount shown in Table 5 (8 g or 10 g) as a powder and sufficiently suspended by stirring. The suspension was heated to the temperature shown in Table 5 and further stirred at the same temperature for 1 hr (slurry washing). The suspension was cooled to room temperature, and a filtration operation was performed under reduced pressure to give a white powder on a petri dish. This cake was dried under reduced pressure at room temperature to give deacylated gellan gum with a reduced content of divalent metal cation as a white powder (Examples 8-12). In Examples 8, 9 and 12 using 10 g of DAG, pure water (75 mL) and sodium chloride (25 g) were used in the exposure operation with an electrolyte solution. On the other hand, in Examples 10 and 11 using 8 g of DAG, pure water (60 mL) and sodium chloride (20 g) were used in the exposure operation with an electrolyte solution. The amounts of metal ion contained in the obtained powders (Examples 8-12) and commercially available deacylated gellan gum (Comparative Example 4) are shown in Table 5.

TABLE 5

|  | DAG (g) | temperature (° C.) | Al (ppm) | Ca (ppm) | Fe (ppm) | K (ppm) | Mg (ppm) | Mn (ppm) | Na (ppm) |
| --- | --- | --- | --- | --- | --- | --- | --- | --- | --- |
| Ex. 8 | 10 | 10 | 130 | 940 | 30 | 7800 | 230 | 3 | 140000 |
| Ex. 9 | 10 | 25 | 110 | 780 | 20 | 8500 | 200 | 3 | 155000 |
| Ex. 10 | 8 | 30 | 150 | 930 | 40 | 6700 | 210 | 3 | 130000 |
| Ex. 11 | 8 | 40 | 160 | 980 | 40 | 7300 | 230 | 3.0 | 140000 |
| Ex. 12 | 10 | 80 | 120 | 850 | 40 | 6600 | 180 | 2.4 | 140000 |
| Com. Ex. 4 (deacylated gellan gum) |  |  | 160 | 3800 | 43 | 40000 | 970 | 7 | 4600 |

From the results shown in Table 5, it was found that metal ion is exchanged and the contents of calcium ion and magnesium ion in deacylated gellan gum decrease at various temperatures.

[Example 13] and [Example 14] (Consideration of Amount of Electrolyte Solution)

In a glass flask were added pure water (38 mL, Example 13) or (150 mL, Example 14), and sodium chloride (13 g, Example 13) or (50 g, Example 14), and the mixture was dissolved at room temperature. Thereto was added deacylated gellan gum (DAG, San-Ei Gen F.F.I., Inc.) (10 g) as a powder and sufficiently suspended by stirring. The suspension was heated to 50° C. and the mixture was further stirred at the same temperature for 1 hr (slurry washing). The suspension was cooled to room temperature, and a filtration operation was performed under reduced pressure to give a white powder on a petri dish. This cake was and dried under reduced pressure at room temperature to give deacylated gellan gum with a reduced content of divalent metal cation as a white powder (Examples 13 and 14). The amounts of metal ion contained in the obtained powder (Examples 13 and 14) are shown in Table 6. Table 6 also shows the amount of the electrolyte solution (i.e., brine) (unit: parts by weight) per 1 part by weight of deacylated gellan gum.

TABLE 6

| | amount of electrolyte solution (parts by weight) | Al (ppm) | Ca (ppm) | Fe (ppm) | K (ppm) | Mg (ppm) | Mn (ppm) | Na (ppm) |
|---|---|---|---|---|---|---|---|---|
| Ex. 13 | 5.1 | 140 | 1400 | 40 | 14000 | 370.0 | 4 | 140000 |
| Ex. 14 | 20 | 130 | 600 | 30 | 3800 | 120 | 2 | 140000 |

From the results shown in Table 6, it was found that the metal ion in deacylated gellan gum is exchanged in various amounts of the electrolyte solution, and the contents of calcium ion and magnesium ion in the deacylated gellan gum change according to the amounts thereof. The calcium ion and magnesium ion in the deacylated gellan gum were more efficiently removed when the amount of the electrolyte solution to be added was higher.

[Experimental Example 7] (Consideration of Brine Concentration)

Figure 2:
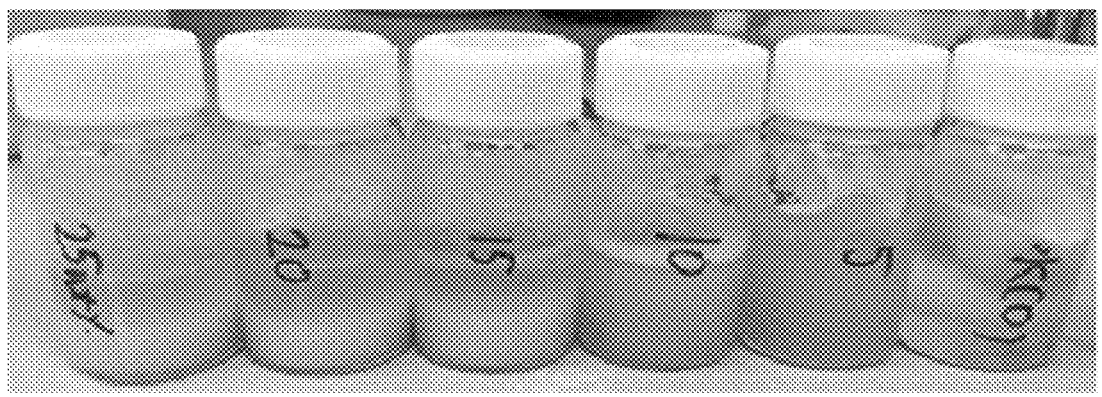
FIG. 2 is a photograph showing the results of Experimental Example 7.

In a glass sample tube were added deacylated gellan gum (DAG, San-Ei Gen F.F.I., Inc.) (1 g) and various concentrations of brine (25, 20, 15, 10, 5 or 0 wt %) (10 g), and the mixture was stirred with a mix roller at room temperature for 10 min. The suspension was stood for 5 min and a sample tube containing the slurry was photographed. The photograph is shown in FIG. 2. The concentrations of the brine were 25, 20, 15, 10, 5 and 0 wt % in this order from the sample tube on the left of the photograph in FIG. 2.

Under the conditions of Experimental Example 7, the deacylated gellan gum maintained a slurry state when the concentration of the brine was not less than 15 wt %.

[Example 15] and [Example 16] (Slurry Washing and Cake Washing with Electrolyte Solution)

In a glass flask were added pure water (75 mL) and sodium chloride (25 g), and the mixture was dissolved at room temperature. Thereto was added deacylated gellan gum (DAG, San-Ei Gen F.F.I., Inc.) (10 g) as a powder, and sufficiently suspended by stirring. The suspension was heated to 50° C. and further stirred at the same temperature for 1 hr (slurry washing). The suspension was cooled to room temperature, and a filtration operation was performed under reduced pressure to give a cake on the filter. A cake washing operation including flowing brine (20 g) adjusted to 25 wt % or 15 wt % into the cake was performed twice. This cake was transferred to a petri dish and dried under reduced pressure at room temperature to give deacylated gellan gum with a reduced content of divalent metal cation as a white powder (Examples 15 and 16). The amount of metal ion contained in the obtained powders (Examples 15 and 16) is shown in Table 7

TABLE 7

| | brine concentration (wt %) | number of washing (times) | Al (ppm) | Ca (ppm) | Fe (ppm) | K (ppm) | Mg (ppm) | Mn (ppm) | Na (ppm) |
|---|---|---|---|---|---|---|---|---|---|
| Ex. 15 | 15 | 2 | 160 | 400 | 40 | 750 | 60 | 2 | 110000 |
| Ex. 16 | 25 | 2 | 140 | 400 | 40 | 830 | 60 | 2 | 140000 |

From the results of Example 4 shown in Table 2, Examples 11 and 12 shown in Table 5, and Examples 15 and 16 shown in Table 7, it was found that the combined use of slurry washing and cake washing with an electrolyte solution causes metal ion exchange compared to slurry washing with electrolyte solution alone.

[Example 17]-[Example 19] (Consideration of Number of Cake Washing with Electrolyte Solution)

In a glass flask were added pure water (450 mL, Example 17) or (1875 mL, Example 18), and sodium chloride (150 g, Example 17) or (625 g, Example 18), and the mixture was dissolved at room temperature. Thereto was added deacylated gellan gum (DAG, San-Ei Gen F.F.I., Inc.) (60 g, Example 17) or (250 g, Example 18) as a powder, and sufficiently suspended by stirring. The suspension was stirred at room temperature (25° C.) for 1 hr (slurry washing). A filtration operation of the suspension was performed under reduced pressure to give a cake on the filter. A cake washing operation including flowing 25 wt % brine (120 g, Example 17) or (490 g, Example 18)) into the cake was performed twice (Example 17) or 4 times (Example 18). This cake was transferred to a petri dish and dried under reduced pressure at room temperature to give deacylated gellan gum with a reduced content of divalent metal cation as a white powder. In the same manner as in Example 17 except that slurry washing with an electrolyte solution (brine) alone was performed and cake washing was not performed, Example 19 was performed. The amounts of metal ion contained in the obtained powders (Examples 17-19) are shown in Table 8.

TABLE 8

|  | number of cake washing (times) | Al (ppm) | Ca (ppm) | Fe (ppm) | K (ppm) | Mg (ppm) | Mn (ppm) | Na (ppm) |
| --- | --- | --- | --- | --- | --- | --- | --- | --- |
| Ex. 17 | 2 | 130 | 280 | 30 | 1100 | 50 | 2 | 159000 |
| Ex. 18 | 4 | 110 | 50 | 30 | 50 | 9 | 2 | 155000 |
| Ex. 19 | 0 | 130 | 820 | 30 | 80 | 200 | 2 | 155000 |

From the results shown in Table 8, the calcium ion content and magnesium ion content became lower as the number of cake washing with an electrolyte solution increased.

[Example 20] and [Example 21] (Consideration of Chlorine Ion Removal)

In a glass flask were added pure water (450 mL) and sodium chloride (150 g), and the mixture was dissolved at room temperature. Thereto was added deacylated gellan gum (DAG, San-Ei Gen F.F.I., Inc.) (60 g) as a powder, and sufficiently suspended by stirring. The suspension was stirred at room temperature (25° C.) for 1 hr (slurry washing with electrolyte solution (brine)). The suspension was subjected to a filtration operation under reduced pressure to obtain a cake on the filter. A cake washing operation with an electrolyte solution (brine) including flowing 25 wt % brine (120 g) into the cake was performed twice. The slurry washing and cake washing with the electrolyte solution were repeated 3 times and the obtained white powder was transferred to a glass flask and slurry washing with a mixture of ethanol/pure water (167 mL/133 mL) (washing liquid) was performed for 30 min. Thereafter, the slurry was filtered under reduced pressure to give a cake on the filter. A cake washing operation with a mixture of ethanol/water (33 mL/27 mL) (washing liquid) prepared in advance was performed twice on this cake and the cake was dried under reduced pressure to give a white powder of deacylated gellan gum with decreased amounts of divalent metal cation and chloride ion (Example 20). In the same manner as in Example 20 except that the cake washing operation with a mixture of ethanol/water (washing liquid) was not performed, Example 21 was performed. The amounts of metal ion and chloride ion contained in the obtained powders (Examples 20 and 21) are shown in Table 9.

TABLE 9

|  | number of cake washing (times) | Al (ppm) | Ca (ppm) | Fe (ppm) | K (ppm) | Mg (ppm) | Mn (ppm) | Na (ppm) | Cl (ppm) |
| --- | --- | --- | --- | --- | --- | --- | --- | --- | --- |
| Ex. 20 | 2 | 140 | 20 | 40 | 50 | 3 | <2 | 31000 | 90 |
| Ex. 21 | 0 | 130 | 20 | 40 | 50 | 6 | <2 | 47000 | 28000 |

From the results shown in Table 9, it was found that the combined use of slurry washing and cake washing with a washing liquid can decrease the amount of chloride ion compared to cake washing only with a washing liquid.

INDUSTRIAL APPLICABILITY

According to the present invention, a macromolecular compound having an anionic functional group can be subjected to an ion exchange reaction while maintaining a slurry state. Thus, a divalent metal mixed in the macromolecular compound having an anionic functional group can be removed with higher volume efficiency compared to the conventional method requiring dissolution in a solvent. Therefore, the method of the present invention is useful for industrial-level purification of a large amount of a macromolecular compound having an anionic functional group.

The contents disclosed in any publication cited herein, including patents and patent applications, are hereby incorporated in their entireties by reference, to the extent that they have been disclosed herein.

This application is based on a patent application No. 2017-091362 filed in Japan, the contents of which are incorporated in full herein.

The invention claimed is:

1. A method for removing a divalent metal cation from a polysaccharide having an anionic functional group and the divalent metal cation, comprising
   (1) exposing a polysaccharide having an anionic functional group and a divalent metal cation to a solution in which an electrolyte that releases an alkali metal ion is dissolved at a concentration at which the polysaccharide is salted out, and
   (2) performing an ion exchange reaction to exchange the divalent metal cation contained in the polysaccharide with the alkali metal ion,
   wherein the polysaccharide is not dissolved in the solution of the electrolyte.

2. The method according to claim 1 wherein the solution of the electrolyte comprises water.

3. The method according to claim 2 wherein the solution of the electrolyte further comprises alcohol.

4. The method according to claim 3 wherein the alcohol is ethanol.

5. The method according to claim 1 wherein the alkali metal ion is sodium ion.

6. The method according to claim 1 wherein the electrolyte that releases an alkali metal ion is sodium chloride.

7. The method according to claim 6 wherein the concentration of sodium chloride in the solution is not less than 10 %(w/v).

8. The method according to claim 1 wherein the ion exchange reaction is performed at 10-80° C.

9. The method according to claim 1 wherein the polysaccharide is exposed to the solution of the electrolyte by suspending the polysaccharide in the solution of the electrolyte.

10. The method according to claim 1 wherein the polysaccharide is exposed to the solution of the electrolyte by passing the solution of the electrolyte through a cake of the polysaccharide.

11. The method according to claim 1 further comprising recovering after the ion exchange reaction the polysaccharide having an anionic functional group, wherein the polysaccharide shows a decreased amount of the divalent metal mixed therein.

12. The method according to claim 11 further comprising removing the electrolyte that releases an alkali metal ion, by washing the recovered polysaccharide having an anionic functional group.

13. The method according to claim 12 wherein a content of calcium ion in the recovered polysaccharide having an anionic functional group is not more than 1000 ppm.

14. The method according to claim 11 wherein a content of calcium ion in the recovered polysaccharide having an anionic functional group is not more than 1000 ppm.

15. The method according to claim 1 wherein the polysaccharide having an anionic functional group is deacylated gellan gum or a salt thereof.

16. The method according to claim 1 further comprising recovering after the ion exchange reaction the polysaccharide having an anionic functional group with filtration, wherein the polysaccharide shows a decreased amount of the divalent metal mixed therein.

* * * * *